(12) United States Patent
Choi et al.

(10) Patent No.: US 7,616,602 B2
(45) Date of Patent: Nov. 10, 2009

(54) METHOD AND SYSTEM FOR WIRELESS LOCAL AREA NETWORK (LAN) COMMUNICATION USING VIRTUAL TIME DIVISION MULTIPLE ACCESS (TDMA)

(75) Inventors: Hyong-uk Choi, Seoul (KR); Seong-hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 10/876,594

(22) Filed: Jun. 28, 2004

(65) Prior Publication Data

US 2004/0264428 A1 Dec. 30, 2004

(30) Foreign Application Priority Data

Jun. 27, 2003 (KR) ...................... 10-2003-0042492

(51) Int. Cl.
H04W 4/00 (2006.01)
(52) U.S. Cl. ....................... 370/329; 370/337; 370/338; 370/347; 370/348; 455/411; 455/410; 455/450
(58) Field of Classification Search ................. 370/341, 370/347–348, 331, 345, 328–330, 337–338; 455/410–411, 450–453
See application file for complete search history.

(56) References Cited

U.S. PATENT DOCUMENTS

| | | | |
|---|---|---|---|
| 5,553,076 A * | 9/1996 | Behtash et al. .............. | 370/311 |
| 5,644,576 A | 7/1997 | Bauchot et al. | |
| 6,341,145 B1 * | 1/2002 | Hioe et al. ................... | 375/256 |
| 7,031,287 B1 * | 4/2006 | Ho et al. ...................... | 370/338 |
| 2002/0071449 A1 | 6/2002 | Ho et al. | |
| 2002/0105970 A1 | 8/2002 | Shvodian | |
| 2003/0203740 A1 * | 10/2003 | Bahl et al. ................... | 455/516 |
| 2003/0231607 A1 * | 12/2003 | Scanlon et al. .............. | 370/338 |
| 2004/0165562 A1 * | 8/2004 | Elaoud et al. ............... | 370/338 |
| 2004/0264397 A1 * | 12/2004 | Benveniste ................... | 370/311 |

* cited by examiner

*Primary Examiner*—Vincent P Harper
*Assistant Examiner*—Dung Lam
(74) *Attorney, Agent, or Firm*—Sughrue Mion, PLLC

(57) ABSTRACT

A time division-based wireless LAN communication method by use of an AP in an infrastructure mode, including, on the AP's side, receiving a time slot allocation request frame from a station, allocating time slots during which the station can transmit data based on the time slot allocation request frame, and broadcasting reservation information on allocated time slots. A time division-based wireless LAN communication system includes an AP receiving a time slot allocation request frame transmitted by a station, allocating time slots on this basis, with which the station can transmit data, and broadcasting reservation information on allocated time slots, and one or more stations transmitting the time slot allocation request frame to the AP when there is data to be transmitted, receiving reservation information on time slots allocated by the AP based on the received time slot allocation request frame, and transmitting the data according to reservation of the beacon.

7 Claims, 8 Drawing Sheets

DCF scheme total: 389.5us    30.8 Mbps

Throughput

PCF scheme total: 357us    33.6 Mbps

Present invention total: 309us    38.83 Mbps

METHOD AND SYSTEM FOR WIRELESS LOCAL AREA NETWORK (LAN) COMMUNICATION USING VIRTUAL TIME DIVISION MULTIPLE ACCESS (TDMA)

This application claims priority of Korean Patent Application No. 10-2003-0042492 filed on Jun. 27, 2003 in the Korean Intellectual Property Office, the disclosure of which is incorporated herein by reference.

BACKGROUND OF THE INVENTION

1. Field of Invention

The present invention relates to a method for transmitting and receiving wireless local area network (LAN) data. More particularly, the present invention relates to a method and a system for transmitting and receiving wireless LAN data on the basis of time slots generated as a result of dividing a contention-free period into a plurality of time slots.

2. Description of the Related Art

Currently, there are several standards involved in data transmission in a wireless manner. For example, Bluetooth is used in constructing a small-sized wireless network, a third generation mobile communication in a WCDMA (wireless code division multiple access) mode, a wireless LAN based on IEEE 802.11 and the like. Among them, the wireless LAN using IEEE 802.11 standard has been successful and its use has increased.

The IEEE 802.11 Standard employs a technique using frequency hopping (FH) and a direct sequence spread spectrum (DS) and a technique using infrared (IR). The early IEEE 802.11 products were limited to 2 Mbps in their transmission speed, but their transmission speed is currently supported up to a maximum speed of 11 Mpbs according to the IEEE 802.11b Standard established in 1999. Meanwhile, 802.11a is based on a technique of orthogonal frequency division multiplexing (OFDM), operating in different frequency bands from 802.11b.

The 802.11 Standard comprises physical (PHY) layers using the frequency hopping and the direct sequence spread spectrum and using an orthogonal frequency division multiplexing. On the physical layer is positioned a data link layer comprising a sublayer of medium access control (MAC) based on 802.11 and a sublayer of logic link control (LLC) based on 802.2.

In a wireless LAN, there are four physical elements: an access point (AP), a wireless medium, a station and a distribution system. The AP performs a function of transforming a frame of a 802.11 network into a frame of a different shape so as to transmit it to a different network, namely a wireless-wired network bridging function. The wireless medium is a comprehensive concept comprising a radio frequency or an infrared physical layer to transmit a frame from a station to another station or an access point. The station refers to any device computing with a wireless network interface, for example, a notebook or a personal digital assistant (PDA). Last, the distribution system interconnects several access points so as to construct wider area covered thereby.

The network is based on basic service sets (BSSs), referring to groups of stations communicating with each other. The BSS is classified into an independent BSS allowing a station to directly communicate with other stations, and an infrastructure BSS compelling a station to communicate with other stations only through an access point. To compare both BSSs, the latter requires for a larger amount of transmission for communication than the former. However, the latter is more advantageous in that, when a station is entered into a power-saving mode, the access point can record it and do a frame buffering for the station, and it is not necessary to use complicated physical layers to maintain a relationship between movable stations since all the stations have to be located within an accessible range from the access point.

Under the 802.11 Standard, there are two methods of accessing media for data transmission: one is a contention based access and the other is a contention free based access. The former is referred to as a distributed coordinator function (DCF) and the latter as a point coordination function (PCF).

The PCF controls data transmission in a contention free period (CFP), thereby enabling data transmission without contention because an access point polls respective nodes sequentially as in a list of nodes, called as a polling list, in the CFP, with the polling list for data transmission without contention between stations. That is, only the station receiving a poll is authorized to transmit data. In this context, PCF can be called a polling and response protocol. In comparison with DCF, PCF is advantageous in that it can assure a quality of service (QoS) to some degree while a station is transmitting data.

FIG. 1 is an exemplary view illustrating data transmission in a contention free period.

Referring to this figure, if an AP polls for a station #1, the station #1 transmits data. The station #1 must pass through the AP in order to transmit data to a station #2. Then, the AP polls for the station #2. At this time, the AP transmits the data received from the station #1 to the station #2, along with the poll. The station #2 may send a null frame to the AP if it has no data to be transmitted. Subsequently, the AP polls for a station #3. The station #3 transmits the data to be transmitted to the station #1, to the AP. The AP polls for a station #4. The station #4 sends a null frame if it has no data to be transmitted. If the contention free period does not end, although the polls for all the stations are finished, the AP again polls for the station #1. At this time, the data to be transmitted to the station #1 by the station #3 is together sent to the station #1 with the polling.

Since this method assures all the stations that they are given an opportunity of transmitting data, but it causes too large overhead for polling. In a word, in order to allow a station to transmit data, an AP always has to poll for the station. Besides, the AP must poll for those stations having no data for transmission, such as station #2 and station #4, and the stations #2 and 4 having no data, have to send null frames. According to a conventional art, it is assured that all the stations are given an opportunity of transmitting data but a wireless channel is used in an inefficient manner.

SUMMARY OF THE INVENTION

Considering the problems described above, an aspect of the present invention is to provide a wireless LAN communication method in a time division method to thereby reduce overhead by polling in a contention free period and another aspect of the present invention is to provide a communication system for the communication method to be provided.

According to an aspect of the present invention, there is provided a time division-based wireless LAN communication method by use of an AP in an infrastructure mode, comprising the steps of, on the AP's side, receiving a time slot allocation request frame from a station, allocating time slots during which the station can transmit data based on the time slot allocation request frame, and broadcasting reservation information on allocated time slots.

The time slot allocation request frame may comprise information on a transmission time required for data transmission and further comprises information on transmission interval to indicate by how many superframes a data transmission is made. To enhance the efficiency of data transmission and reception, the method may further comprise the step of determining whether the station having transmitted the time slot allocation request frame is authorized, wherein time slots are only allocated to any authorized station. Also, the method may further comprise the step of readjusting a time slot allocation and broadcasting the new reservation information adjusted, where no data transmission is made during the predetermined time. The reservation information comprises the association ID (AID) of a station and a start time of the time slots allocated and further comprises information on a transmission interval to indicate by how many superframes a data transmission is made. Desirably, the time slot allocation request frame is received by the AP in the contention period.

According to another aspect of the present invention, there is provided a time division-based wireless LAN communication method comprising the steps of, on a station's side, generating a time slot allocation request frame and transmitting it to an AP, receiving reservation information on the time slots allocated by the AP based on the time slot allocation request frame and broadcasted to the station, and transmitting data through the AP according to the reservation information.

The time slot allocation request frame may comprise information on a transmission time required for data transmission and further comprises information on a transmission interval to indicate by how many superframes a data transmission is made. The method may further comprise the step of transmitting a reservation termination frame to the AP to cancel a channel allocation when allocated time slots remain but there is no data to be transmitted. Preferably, the time slot allocation request frame is generated and transmitted in the contention period.

According to a still another aspect of the present invention, there is provided a time division-based wireless LAN communication system comprising an AP receiving a time slot allocation request frame transmitted by a station, allocating time slots on this basis, with which the station can transmit data, and broadcasting reservation information on allocated time slots, and one or more stations transmitting the time slot allocation request frame to the AP where there is data to be transmitted, receiving reservation information on time slots allocated by the AP based on the received time slot allocation request frame, and transmitting the data according to a reservation of a beacon.

The AP may comprise a resource management unit managing the total resources available for use, a slot time control unit receiving the resources from the resource management unit and allocating time slots based on the received time slot allocation request frame, and a beacon generating unit generating a beacon containing time slots-allocated reservation information, and further comprises an access control list management unit storing therein a list of those stations authorized for access, wherein the AP allocates time slots only when the station having transmitted the time slot allocation request frame is included in the list.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, exemplary embodiments of the present invention will be described in detail with reference to the accompanying drawings.

Figure 1:
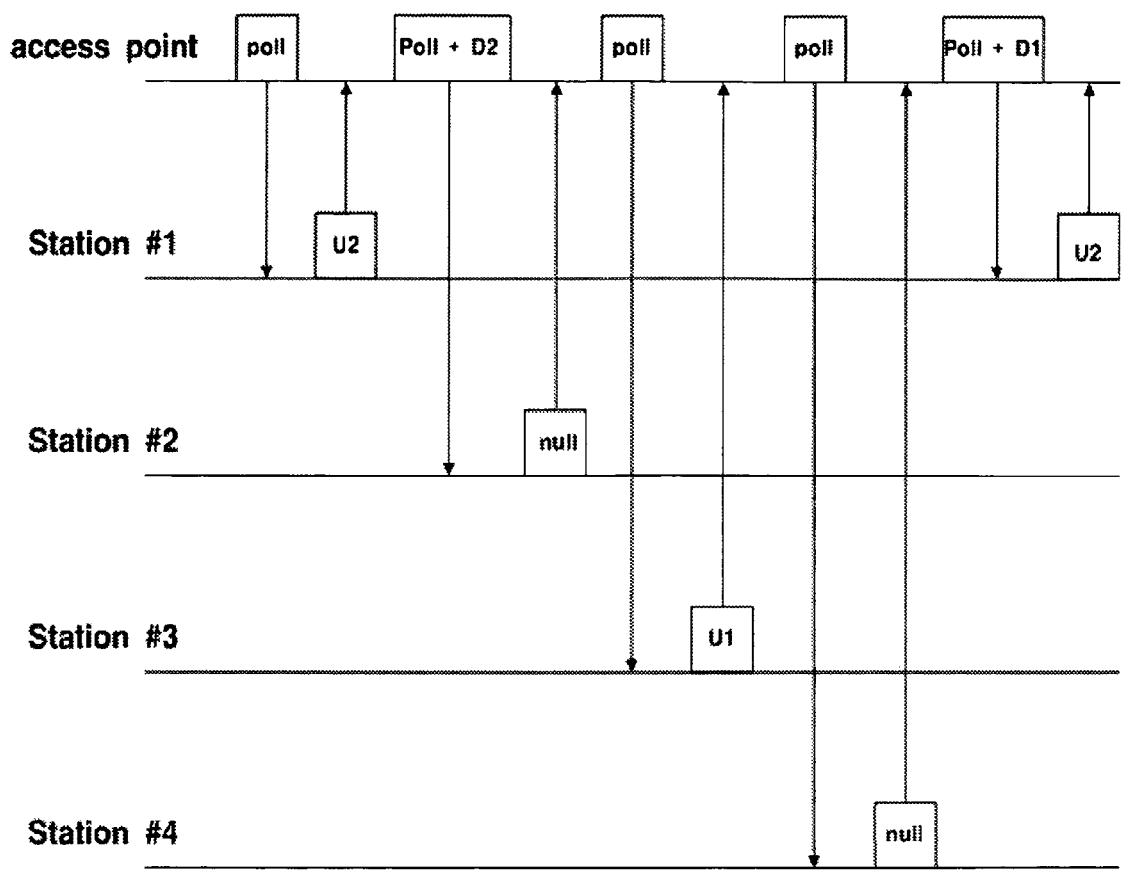
FIG. 1 is an exemplary view illustrating data transmission in a contention free period.
Figure 2:
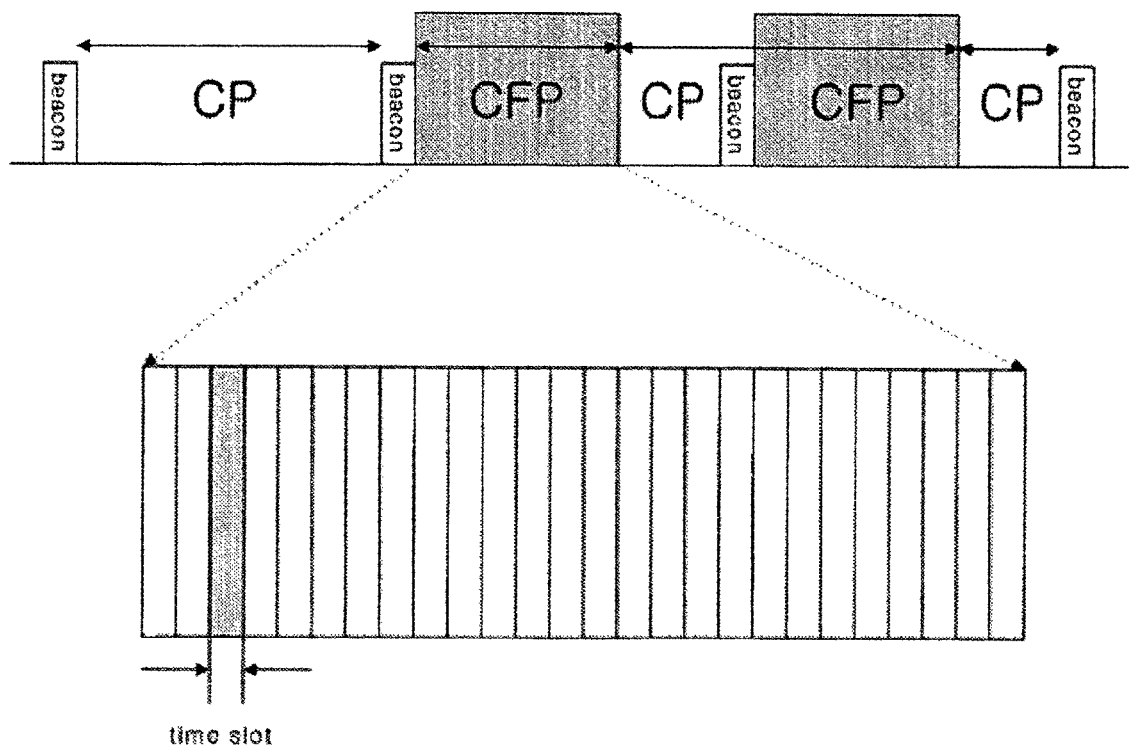
FIG. 2 is an exemplary view illustrating a contention free period divided into a plurality of time slots according to an aspect of the present invention.

FIG. 2 is an exemplary view illustrating a contention free period divided into a plurality of time slots according to an aspect of the present invention.

Referring to this figure, a superframe is classified into a contention period and a contention free period. The contention free period is divided into a plurality of time slots. The length of one time slot has been established in a management information base (MIB).

When stations need quality of service (QoS) data transmission, they contend with each other during the contention period in requesting an access point (AP) to allocate time slots.

Based on the time slot allocation request sent by each station, the AP makes out a schedule for the time during which the stations transmit data. In a word, time slots are allocated to each station. At this time, it is desirable for the AP to make allocation in consideration of the data transmission time of the station and the acknowledgement (ACK) time of other stations receiving the data. In the time slot allocation, it is also desirable to consider a case that there are data that the AP has to transmit to one or several stations. In the meantime, in order to avoid data collision between slots, it is desirable to include the minimum intervals between slots, required for maintaining a timing synchronization function of a IEEE 802.11 wireless LAN.

In an exemplary preferred embodiment, reservation information on time slots allocated to respective stations are broadcasted within a beacon by an AP.

The stations can know the time when they have to transmit data, on the basis of the reservation information received through the beacon; the stations transmit data using the time slots allocated to them. In an embodiment, the contention period follows the contention free period. Since a contention period starts after a contention free period terminates, those stations desirous of new time slot allocation, request the AP to allocate new time slots.

Figure 3:
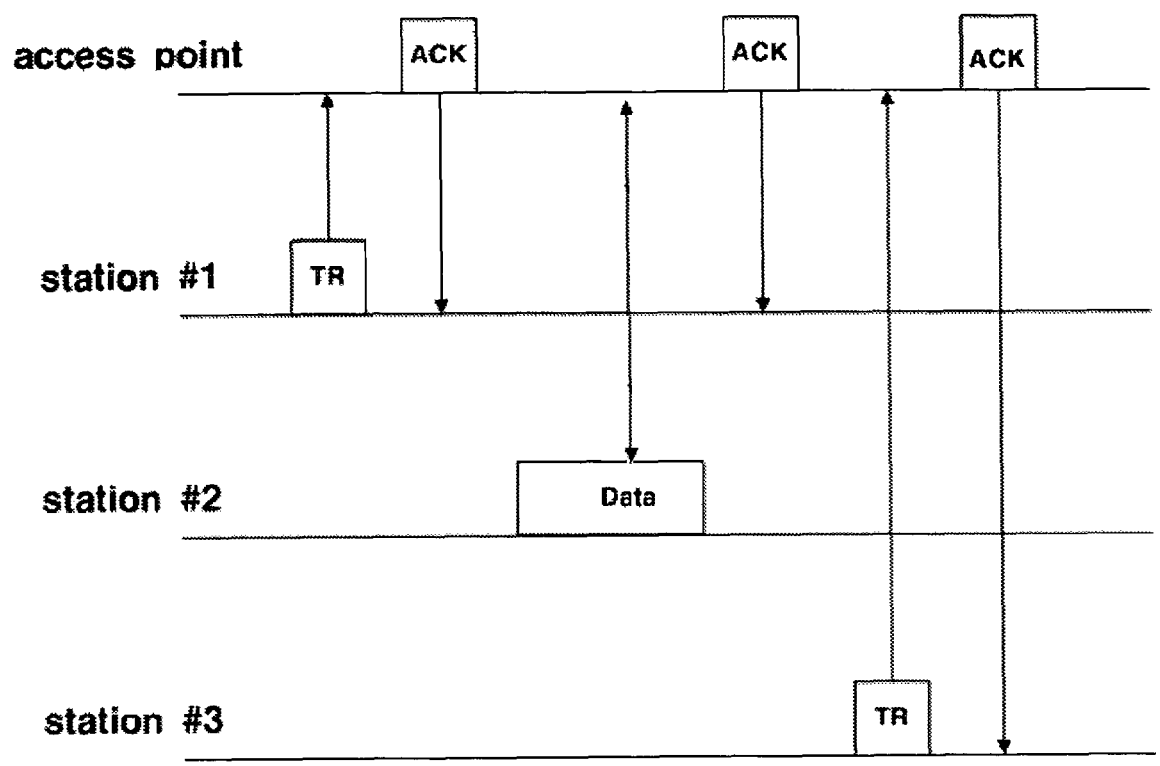
FIG. 3 is an exemplary view illustrating a process of transmitting a request frame for time slot allocation in a contention period according to an aspect of the present invention.

FIG. 3 is an exemplary view illustrating a process of transmitting a request frame for time slot allocation in a contention period according to an aspect of the present invention.

Referring to this figure, there are an AP and three stations to transmit data. Stations #1 and 3 transmit time slot allocation request frames to an AP to receive data to be transmitted. Station #2 transmits data. The operations involved in the above process are generated during a contention period.

With reference to FIG. 3, it has been described that time slot allocation is requested in a contention period, but the technical idea of the present invention is not limited thereto. Time slot allocation may be made in a contention free period. For example, if an AP polls for Station #1, Station #1 transmits a time slot allocation request to the AP in lieu of a data frame. If the AP polls for Station #2, Station #2 transmits data. Then, if Station #3 polls for Station #3, Station #3 transmits a time slot allocation request to the AP. Last, if the AP polls for Station #4 (not shown), Station #4 transmits a null frame to indicate that it has no data to be transmitted, to the AP.

Figures 4, 5:
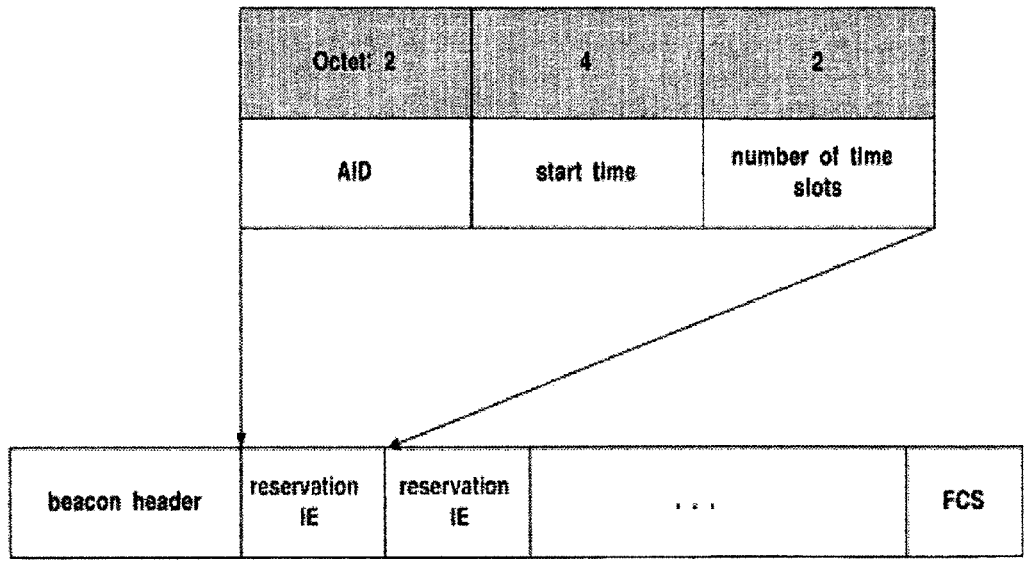
FIG. 4 is an exemplary view illustrating a construction of a request frame for time slot allocation according to an aspect of the present invention.
FIG. 5 is an exemplary view illustrating reservation information elements and a structure of a beacon frame comprising them according to an aspect of the present invention.

FIG. 4 is an exemplary view illustrating a construction of a request frame for time slot allocation according to an aspect of the present invention.

The time slot allocation request frame comprises a frame control, a duration ID, a receiver address (hereinafter referred to as "RA"), a basic service set (BSS) ID (hereinafter referred to as "BSSID"), an association ID (hereinafter referred to as "AID"), a transmission interval, a transmission duration, and a frame check sequence (hereinafter referred to as "FCS").

The frame control is composed of two bytes. The first two bits indicate a protocol version. The next two bits indicate a type of frame and the next four bits indicate a subtype of frame. A management frame has a type of "00," a control frame has a type of "01" and a data frame has a type of "10." Each type is divided by subtypes. For example, the type of a beacon frame is management and its subtype is "1000." "0110-0111" and "1101-1111" have been reserved for the subtypes of management but have currently been in no use. "0000-1001" and "1101-1111" have also been reserved for the subtypes of control but have been in no use. Likewise, "1000-1111" has been reserved for the subtypes of data but has also been in no use. For the time slot allocation request frame, one of the reserved subtypes may be selected. The duration ID may be used for establishment of a network allocation vector (NAV) or any frame transmitted during the contention free period and any frame for power save-poll. The RA is a 48-bit IEEE MAC identifier corresponding to a station transmitting bits to a upper protocol layer for operation of a frame, like Ethernet. The BSSID is used to identify a wireless LAN in the same area, and an ad hoc network generates a temporary BSSID by setting a universal/local bit to 1, in order to avoid any conflict with an official designated MAC address.

The AID is a number with which the AP identifies stations, and each station has a unique value. An AID is transmitted along with the time slot allocation request frame. The transmission interval refers to the frequency number of a superframe relative to the allocation request. That is, it is a numeral to indicate by how many superframes a transmission is made. The number of time slots indicate the total number of time slots requested per superframe.

Last, the frame check sequence (FCS) indicates the field used to inspect the integrity of a received superframe, often called a cyclic redundancy check (CRC). The FCS is calculated prior to transmission by a radio frequency or infrared when a frame is transmitted in a wireless manner. In the meantime, a receiving station calculates the FCS from the received frame and compares it with the received FCS, and then determines that the frame has had no trouble in the course of transmission if they are identical. If there is no trouble, the receiving station sends an acknowledgement (ACK) response to the transmitting station. 802.11 Standard specifies that, where there is trouble, the receiving station sends no message and the transmitting station transmits the frame again unless an ACK response is received after the predetermined time has passed.

FIG. 5 is an exemplary view illustrating reservation information elements and a structure of a beacon frame comprising the reservation information elements according to an aspect of the present invention.

Each reservation information element comprises an AID, a start time indicating the time to start data transmission and the number of time slots indicating by how many time slots data are to be transmitted. Preferably, the reservation information element (IE) is carried on the payload of a beacon when the beacon is broadcast. When several stations request time slot allocation, a reservation ID for time slot allocation information is made per station.

Figure 6:
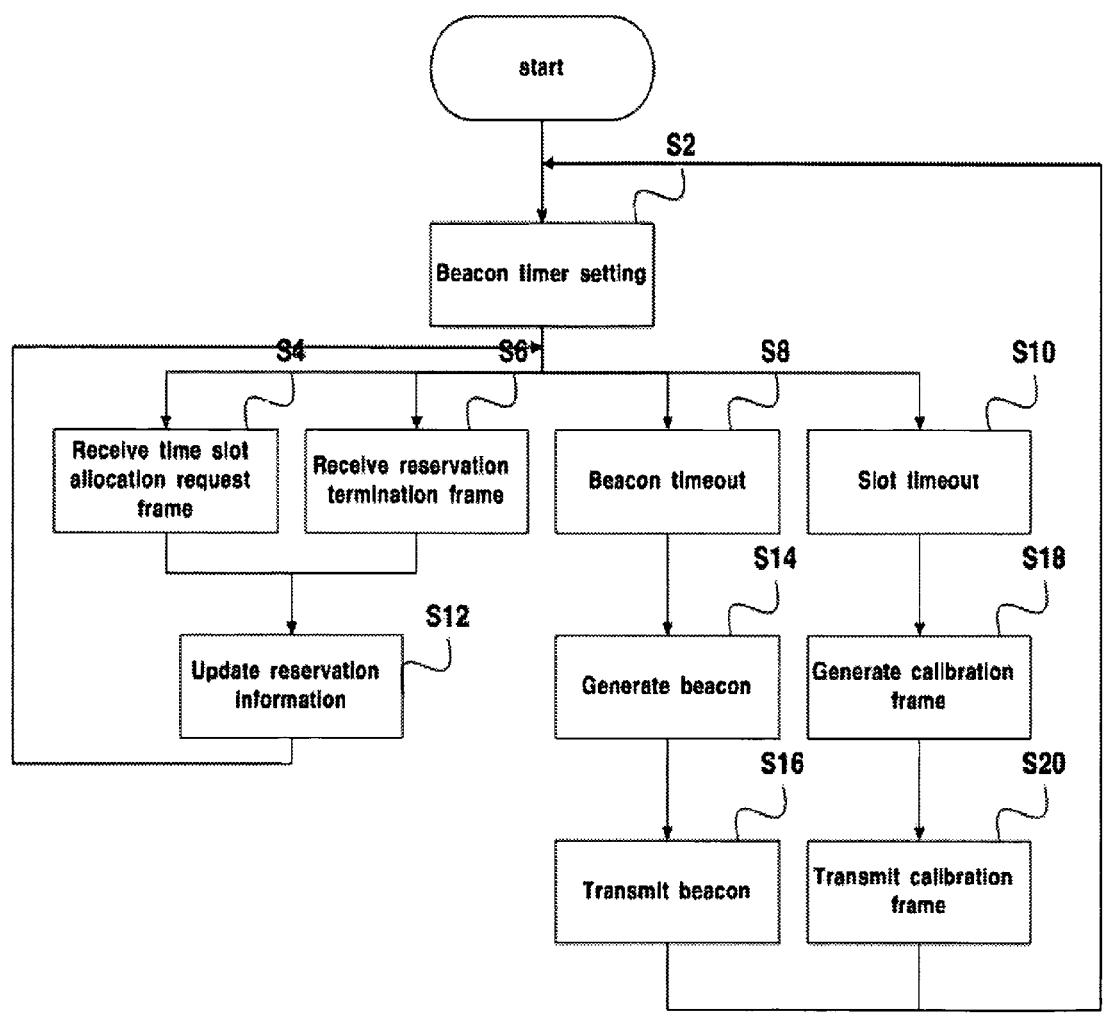
FIG. 6 is a flow chart illustrating an operation of an access point (AP) according to an aspect of the present invention.

FIG. 6 is a flow chart illustrating an operation of an access point (AP) according to an aspect of the present invention.

An AP sets up a beacon timer immediately after transmitting the beacon S2. The beacon timer starts counting immediately after the beacon is transmitted. If a time slot allocation request frame is received from a station thereafter S4, the AP updates the time slot allocation reservation information stored therein S12. If the beacon timer continues counting and reaches the beacon timeout S8, the AP generates a new beacon S14.

When a new beacon is generated, the time slot allocation reservation information at that time is transferred to the generated new beacon. The generated beacon is transmitted to a wireless channel S16. The AP renews a setup of the beacon timer after transmitting the beacon S2.

In the meantime, when a station receives a time slot allocation but has no data to be transmitted, it transmits a reservation termination frame to the AP. If the AP receives the reservation termination frame S6, it cancels the time slot allocation of the station having transmitted the reservation termination information and updates the reservation information S12. In addition, where a station having received time slot allocation does not start data transmission until the predetermined time, e.g., 50% of the time slots, has passed in order to more efficiently utilize the time slots S10, a calibration frame is generated S18 and transmitted to the wireless channel S20. When the calibration frame is generated, a station having transmitted no data may be excluded in the time slot allocation reservation or the time to transmit data may be delayed after other station. The setup of the beacon timer is renewed again after the calibration frame is transmitted S2.

As described above, the calibration frame is a kind of a beacon frame, indicating a frame to re-adjust the interval between time slots, not a beacon frame to be transmitted at the regular interval.

Figure 7:
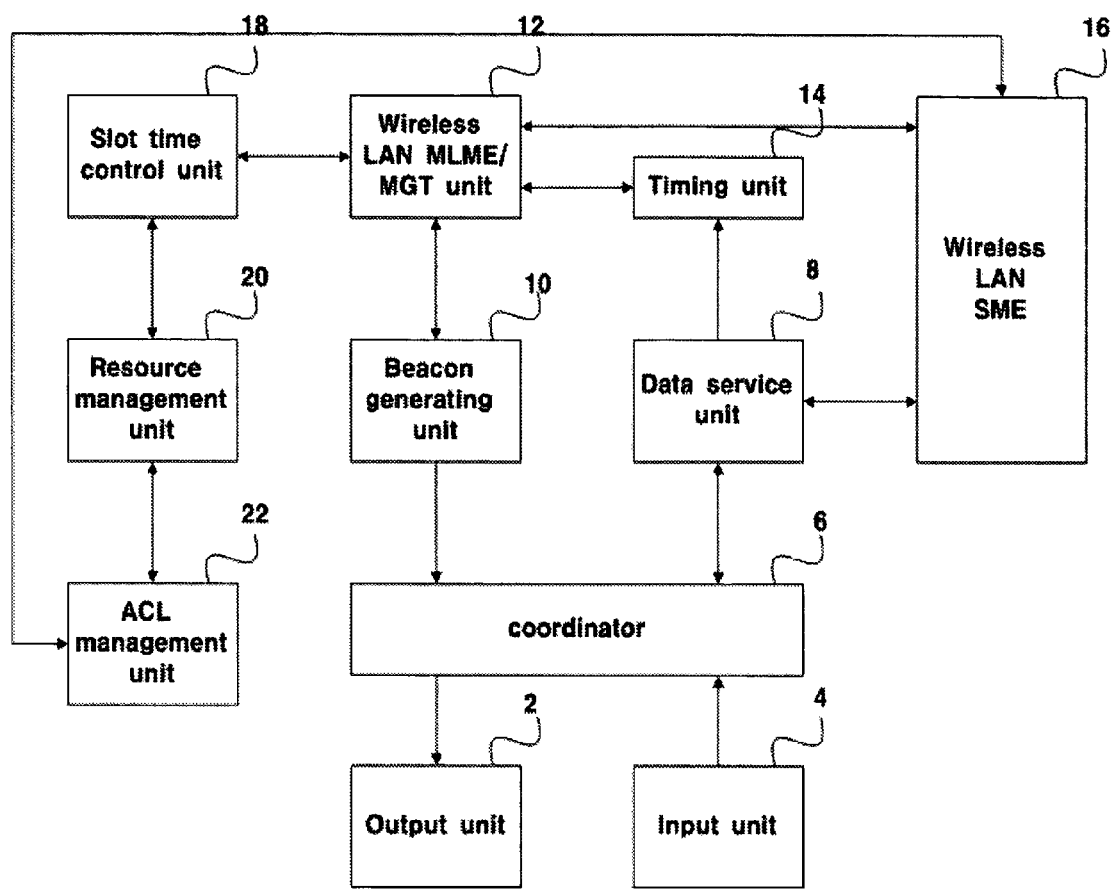
FIG. 7 is a block diagram illustrating a structure of an AP according to an aspect of the present invention.

FIG. 7 is a block diagram illustrating a structure of an AP according to an aspect of the present invention.

Referring to this figure, an AP comprises an input unit 4 and an output unit 2 for data input and output. The AP receives data having passed through the input unit 4 and transmits them to a data service unit 8, or receives data or a beacon from the data service unit 8 or a beacon generating unit 10 and transmits them to the output unit 2. A wireless LAN station management entity (SME) 16 provides an appropriate MAC operation. A timing unit 14 is placed between the data service unit 8 and a wireless LAN MLME/MGT unit 12, and controls and manages them so that actual input and output of data can be exactly observed according to the predetermined time and the duration. A slot time control unit 18 allocates and controls time slots scheduled according to resource allocation by a resource management unit 20 and the resource management unit 20 continuously monitors the overall resources available for allocation in an integrated manner, thereby resulting in efficient distribution of the resources. In the present invention, the AP may further comprise an ACL management unit 22 to manage a list of those stations authorized for allocation of time slots only to the authorized stations.

Figure 8:
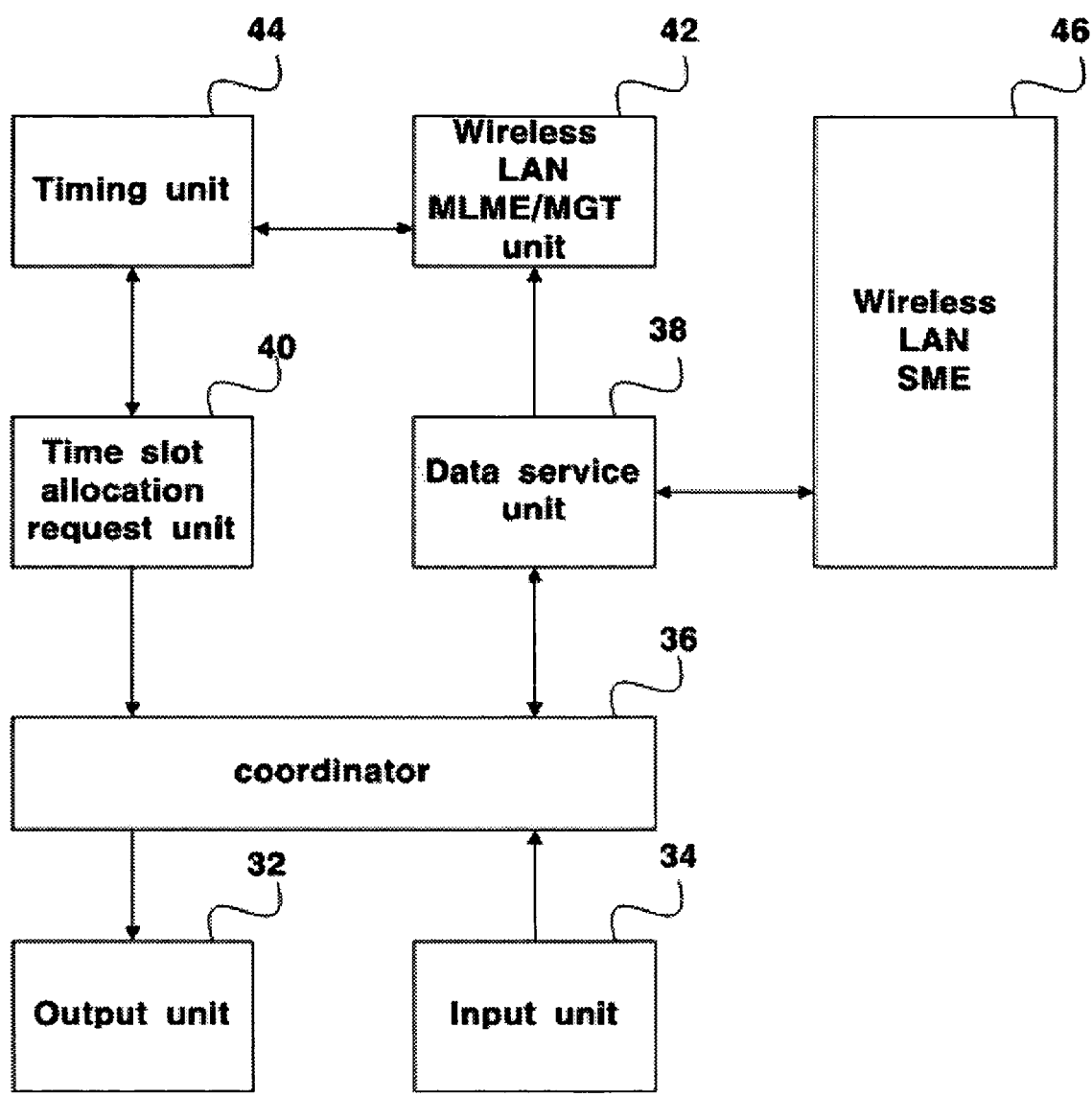
FIG. 8 is a block diagram illustrating a structure of a station according to an aspect of the present invention.

FIG. 8 is a block diagram illustrating a structure of a station according to an aspect of the present invention.

Referring to this figure, a station comprises an input unit 34 and an output unit 32 for input and output of data. The station receives data having passed through the input unit 34 and transmits them to a data service unit 38, or receives data or a time slot allocation request frame from the data service unit 38 or a time slot allocation request from time slot allocation request unit 40 and transmit them to the output unit 32. A wireless LAN SME 16 provides an appropriate MAC operation. A timing unit 44 checks whether actual input and output of data can be exactly observed according to the predetermined time and the duration. A time slot allocation request unit 40 generates a time slot allocation frame requesting any required resource adaptive to the traffic characteristics based on parameters of data requested by an application.

Figure 9:
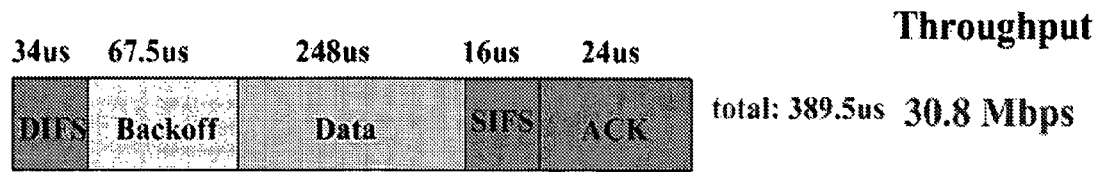
FIG. 9 is an exemplary view illustrating a difference in amount of transmission data between the conventional methods and the present invention.
Figure 9:
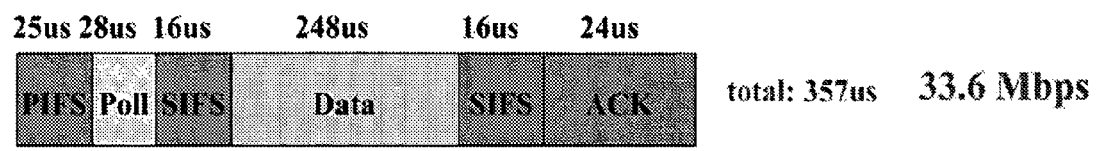
Figure 9:

FIG. 9 is an exemplary view illustrating a difference in amount of transmission data between the conventional methods and the present invention.

Referring to this figure, the transmission speeds when data of 1500 bytes are transmitted, are illustrated.

When data is transmitted in DCF mode, the total time including distributed interframe space (DIFS), Backoff, Data, SIFS and ACK is 389.5 us, and thus, the total speed is 30.8 Mbps in total. When data is transmitted in PCF mode, the total speed is likewise 33.6 Mbps. Following a mode according to the present invention, the total speed is 38.83 Mbps, indicating that data transmission speed becomes faster than conventional modes.

With respect to the above-described exemplary embodiments, it has been described that time slots exist in a contention free period, but the time slots may also exist in a contention period. That is, if a station to which time slots are allocated can transmit data without waiting for DIFS and random backoff of the contention period when the time for the station to transmit data approaches, data transmission can be made in the contention free period.

As described above, the present invention may assure the quality of service (QoS) of the stations in data transmission in the contention period as well as in the contention free period. Also, the inefficiency of the conventional arts requiring for polling for those stations having no need of data transmission in the contention free period can be improved. Further, the overhead to the stations ready to transmit data resulting from polling can be reduced since they can transmit data through time slots allocated to themselves without polling.

It should be understood, therefore, that the aforementioned embodiments are only illustrative in all respects and the present invention is not limited thereto. The scope of the present invention is defined by the appended claims rather than the detailed description of the invention. All changes or modifications made from the spirit and scope of the invention and equivalents thereof should be construed as falling within the scope of the invention.

What is claimed is:

1. A time division-based wireless local area network (LAN) communication method using an access point (AP) in an infrastructure mode, comprising, on the AP's side:
   receiving a time slot allocation request frame from a station;
   allocating time slots during which the station can transmit data based on the time slot allocation request frame;
   broadcasting reservation information on said allocated time slots; and
   readjusting said time slot allocation and broadcasting new adjusted reservation information, when no data transmission is made during a predetermined time,
   wherein, when the AP allocates said time slots, a minimum interval between said time slots is added to the time slots so as to allow time synchronization function (TSF) of the IEEE 802.11 wireless LAN to be maintained, in order to avoid data collision between the time slots, and
   wherein the minimum interval is added to the time slots such that data collision between the time slots is avoided,
   wherein the AP manages a list of stations authorized for access, and
   wherein the AP allocates said time slots only when the station having transmitted the time slot allocation request frame is included in the list.

2. The method as claimed in claim 1, wherein the time slot allocation request frame comprises information on a transmission time required for data transmission.

3. The method as claimed in claim 2, wherein the time slot allocation request frame further comprises information on a transmission interval to indicate by how many superframes said data transmission is made.

4. The method as claimed in claim 1, further comprising determining whether the station having transmitted the time slot allocation request frame is authorized,
   wherein said time slots are only allocated to any authorized station.

5. The method as claimed in claim 1, wherein the reservation information comprises an association ID (AID) of the station and a start time of the allocated time slots.

6. The method as claimed in claim 5, wherein the reservation information further comprises information on a transmission interval to indicate by how many superframes said data transmission is made.

7. The method as claimed in claim 1, wherein the time slot allocation request frame is received by the AP in a contention period.

* * * * *

UNITED STATES PATENT AND TRADEMARK OFFICE
CERTIFICATE OF CORRECTION

| | | |
|---|---|---|
| PATENT NO. | : 7,616,602 B2 | Page 1 of 1 |
| APPLICATION NO. | : 10/876594 | |
| DATED | : November 10, 2009 | |
| INVENTOR(S) | : Choi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1272 days.

Signed and Sealed this

Nineteenth Day of October, 2010

David J. Kappos
*Director of the United States Patent and Trademark Office*